2,704,420
Patented Mar. 22, 1955

2,704,420

PROCESS FOR MAKING COMPOSITE GLASS ARTICLES

Lewis P. Ohliger, Sweden, N. Y., assignor to Bausch & Lomb Optical Company, Rochester, N. Y., a corporation of New York No Drawing. Application November 4, 1949, Serial No. 125,656

4 Claims. (Cl. 49—82.1)

This invention relates to new and improved methods of manufacturing composite glass articles consisting of a plurality of integrally united glass elements produced by effecting face-to-face and edge-to-edge glass fusions of at least surface portions of the elements, which is especially applicable but not limited to the production of multi-focal ophthalmic lenses composed of a plurality of integrally united optically different glass elements unified by fusion at their facing surfaces.

The manufacture of composite glass articles by fusion of glass surfaces for the purpose of uniting a plurality of glass parts or elements is a widely practiced art involving difficult technical problems, and such is particularly true in the making of multi-focal (e. g., bifocal or trifocal) lenses by integrally uniting a plurality of elements formed of optical glass. It is well-known that it is not only difficult to secure a good union between glass surfaces by fusion but that the composition of the glass has a considerable bearing upon the ease of its fusibility and its being united with different glasses. This is true for a number of reasons including differences in the surface tension of different fused glasses at the same temperature which result in differences in the abilities of the glasses to wet other glass surfaces; differences in fusion temperatures and viscosity of fused glasses of different compositions; variations in coefficients of expansion with both composition and temperature; the surface crystallization which occurs at fusion temperatures and other physical or physico-chemical properties such as heat conductivity and heat transfer characteristics, specific gravity and viscosity characteristics at a given temperature. Of these difficulties in obtaining a satisfactory fusion, the matter of control of the surface tension differential at the glass to glass interface and "wetting" properties is one of the most serious.

As a result of imperfect and inadequate control over the above conditions, the proportion of rejectable composite glass articles when produced by glass fusions is relatively high, particularly in the making of multi-focal optical lenses which must pass rigid inspections and tests. These fusions are apt to be imperfect or incomplete in such respects as the formation of lakes or bubbles and objectionable reflective properties at the fusion interface, producing a visible line or grayness. This latter factor is one which is particularly troublesome and which is probably largely responsible for the relatively large percentage of unsatisfactory fusions. So far as I am aware, there has not heretofore been proposed any satisfactory method of avoiding these imperfections and improving the proportion of acceptable fusion products.

It is, accordingly, an object of this invention to treat glass parts or elements, prior to their unification into composite articles by fusion, with chemical substances which so modify the surface tension and other characteristics of the fused glass elements as to overcome the foregoing and other difficulties and disadvantages and which make it possible to produce glass fusions with greatly lessened proportion of rejects while also yielding acceptable fusion products of improved quality.

Another object of this invention resides in treating optical or other glass parts or elements with certain oxygen-containing compounds comprising an element selected from the group consisting of molybdenum, arsenic, tungsten and vanadium, either in the form of aqueous solutions of the said compounds, by use of the compounds as additives to the glass melt, or by depositing the compounds upon the parts or elements as a condensate from the vapor phase, in order to reduce the glass-to-glass interface tension and to increase the wetability and improve the contact of the glass surfaces.

A further object of the invention resides in applying to optical or other glass parts or elements to be used in making a composite glass article, a solution of molybdic acid or sodium molybdate or corresponding arsenates, tungstates or vanadates.

More specifically, an object of this invention resides in the application to glass surfaces, glass parts or elements to be incorporated into a composite glass article, prior to their fusion, of a 1–10% aqueous solution of a water-soluble molybdate, arsenate, tungstate or vanadate at a mild elevated temperature for a few hours, preferably, a 4% solution of sodium molybdate at a temperature of 75° C. for a period of ½ to 2 hours.

Other and further objects and advantages will be understood and appreciated by those skilled in this art or will be apparent or pointed out hereinafter.

The invention will now be described in detail, as exemplified in its application to the method of making optical lenses of the multi-focal type, but it is to be understood that such does not constitute a limitation upon the invention, which is applicable to the manufacture of other types of composite glass articles from various compositions and types of glasses irrespective of their ultimate use. The invention may, for example, be applied to the production of vacuum tubes and other glass bulbs and to the production of sundry composite articles in which one glass part or element is fused to another.

The methods of and considerations relating to the making of optical lenses, such as multi-focal lenses, are well exemplified by Patents 2,035,827, issued March 31, 1936, and 2,112,659, issued March 29, 1938. These patents involve the fusing of optical glass segments or elements of various shapes and in various relationships in connection with the manufacture of bifocal and trifocal lenses. This invention is particularly applicable for use in connection with the procedures described and claimed in those patents. The so-called "Kryptok" type of lens represents another optical application wherein the principles of the present invention may be utilized, and, in making this type of lens, a minor lens member, known as a disc or button and having a ground and polished surface, is fused into a countersink provided in the major lens member, following which the assembly is ground to finished form. The major and minor lens members have different refractive indices and the difference in the refractive indices determines the dioptric power of the multi-focal portion of the lens. Thus, it will be particularly noted that the invention is equally applicable to face-to-face (Kryptok type) fusions of glass parts or elements as well as to edge-to-edge (whether externally or internally disposed) type fusions. Moreover, either type of fusion can be effectively carried out in accordance with my invention independently of the physical, optical or other characteristics of the individual glass parts or elements and, therefore, the invention makes it unnecessary to select any special glasses with any special properties insofar as their uniting by fusion is concerned but, of course, in optical lenses the refractive indices and compositions of the glasses are selected depending upon the optical properties which it is desired or required to obtain.

In general, my invention comprises a process for making composite glass articles including the step of the chemical treatment of optical or other glass parts, segments or elements upon at least the surface parts thereof prior to their fusion with an oxygen-containing chemical compound comprising a group V or group VI heavy metal—e. g., a solution of molybdic acid, arsenic acid, tungstic acid or vanadic acid or mixtures thereof, or their water-soluble salts such as their sodium salts. I have further found that these solutions have an operative range in terms of concentration from approximately 1–10%. When glass surfaces are treated with such compositions, they act upon the glass to provide thereon an extremely thin but highly concentrated skin of a molybdenum-containing, arsenic-containing, tungsten-containing or vanadium-containing phase. This treatment may be carried out by dipping, spraying, brushing or otherwise applying the solutions to the glass surfaces. It is not necessary to restrict application of the solutions only to those glass surfaces which are to be fused, but the entire glass parts, segments or elements may be treated, thus facilitating treatment and avoiding undue delay in production schedules. The treatment with these compositions is carried out at a mild elevated temperature not over approximately 90° C. and I have found that the temperature range of 25–90° C. is especially effective in producing exceptionally good results without adverse secondary results and, therefore, is of critical significance. The treatment is carried out for a period of time ranging up to a few hours, it being understood that the temperature and time factors depend somewhat upon the composition of the glass, since the harder and more durable glasses generally require more treatment than other glasses. The time factor also depends somewhat upon the concentration of the salt—that is to say, whether it is near the lower or the upper part of the designated percentage range and upon the temperature involved. Specifically, I have found that optimum results are achieved by treating segments or buttons of optical glass, intended for use in the making of multi-focal lenses, with a 4% solution of sodium molybdate at a temperature of 75° C. for a period of ½–2 hours, when the optical glass parts being treated are formed of barium crown glass. The sodium molybdate herein referred to is the salt represented by the formula: $Na_2MoO_4 \cdot 2H_2O$.

The foregoing treatment is carried out at that stage in the making of multi-focal lenses or other articles just prior to the fusion thereof, whether that fusion be of the face-to-face type, such as the "Kryptok" multifocal lenses above-mentioned, or of the edge-to-edge type, as exemplified by the above-mentioned patents. The invention comprises not only the said 1–10% solutions of molybdic acid and water-soluble salts of molybdic acid, such as sodium molybdate, but also solutions of arsenic acid, tungstic acid and vanadic acid and their water-soluble salts as well as to mixtures of such acids and/or salts. Sodium salts are preferred, but I may use any suitable water-soluble alkali or alkaline earth metal salt or other water-soluble salt.

While I have found that the foregoing external chemical treatment of the glass surfaces is the simplest, best and least expensive manner of realizing the invention, I may also obtain the benefits of the invention by adding one or more of the herein-described compositions to the standard or conventional slurries which are employed in polishing the ground optical glass parts, segments or elements to be used in making the desired composite glass articles. An example would be to use zirconium, titanium or cerium molybdate as an addition to the standard zirconium oxide, titanium oxide or cerium oxide polishing slurries. Similar results can furthermore be achieved by exposing the glass members, prior to fusion, to the vapors of molybdates, arsenates, tungstates or vanadates, this resulting in the formation, deposition or condensation of a similar thin film or coating upon the glass, which produces the herein-specified results. The same temperature and time factors above set forth apply to these modified method phases of the invention.

I may, if I so desire, also carry out the invention by incorporating a small amount of an oxide of molybdenum, vanadium, tungsten or arsenic in the molten batch of glass from which the lenses, segments, parts or other articles are fabricated. In this connection it has been found that an amount of molybdenum oxide—preferably molybdic oxide—or the other mentioned oxides, need only be incorporated in the molten glass batch to the extent of 0.001–0.4%. Low concentrations of this order have been found to be sufficient to affect the fusion favorably and are low enough to avoid undesirable or adverse changes in the optical or other properties of the glasses produced therefrom. Although the amount of such oxide is extremely small, it is to be distinguished from and not confused with mere trace impurities which might exist in rare instances, it being noted that the oxides of molybdenum, vanadium, tungsten and arsenic do not normally occur in glasses or glass batches, particularly those intended for the production of optical glass.

It will be understood from the foregoing that this invention makes it possible to produce greatly improved composite glass articles by fusions between glass parts and especially between the various lens segments of multi-focal ophthalmic lenses of the bifocal and trifocal types, and that these new and highly useful results are achieved without adversely affecting the physical and optical properties of the glass parts and with a decrease in lake and bubble formation in the fused zones which are characterized by the presence of modified glass phases derived from oxygen compounds of molybdenum, arsenic, tungsten and vanadium, such as their acids, salts, oxides and solutions. Surface crystallization during fusion is likewise diminished or substantially eliminated and, generally speaking, the percentage of usable and perfect fusions is vastly greater than has heretofore been able to be accomplished by prior methods. This invention has the further and important advantage that types of glasses which were heretofore unusable or unsuitable to a given fusion schedule now become utilizable, since fusion temperatures are modified—i. e., decreased—by employing the methods and compositions of this invention, thereby also providing for better control of the associated processes involved in the making of composite fused glass articles, since warping and distortion, particularly along interface fusion planes, are greatly reduced or substantially eliminated. So far as I am aware, these effects have not heretofore been achieved, especially by means of an external chemical treatment.

This invention is also applicable to the production of exceptionally high-quality, first fusions of so-called "Panoptik" bifocals and especially those which are provided with "Ray-Ban" glass, the latter type of glass being an anti-glare or tinted iron glass, it being noted in this connection that the wetting properties of iron glasses, such as those of the "Ray-Ban" type, are distinctly inferior to other glasses, and satisfactory fusions involving the same have therefore been difficult of accomplishment. The invention is likewise applicable to various compositions of glasses and has special value and application to ophthalmic glasses, including Flint (e. g., lead) glasses, Crown (e. g., soda lime) glasses, Barium Crown (e. g., both conventional and colored) glass, as well as special (e. g., borate and phosphate) glasses.

Composite glass articles and ophthalmic lenses produced in accordance with this invention do not have undesirable grayness characteristics and do have highly improved interface reflective properties, in which connection both excessive gloss and excessive scattering of light are absent. It is particularly surprising that barium- and lead-containing segment glasses are so greatly improved in their bubble quality by the incorporation of a relatively minute amount of the foregoing oxide compositions, to the extent of less than approximately 0.4% and as little as 0.001%.

The foregoing is, moreover, to be understood as exemplary or illustrative and not as restrictive or limitative since other and further modifications may be made within the terms and spirit of the appended claims without departing from the invention.

I claim:

1. In a process for making composite glass articles consisting of a plurality of integrally united glass elements unified by fusion at their contactive surfaces whereby at least one of the glass elements when fused wets and adheres to another, the steps of applying to a surface portion of one of the glass elements prior to fusion an aqueous solution containing 1% to 10% of a water-soluble oxygen-containing inorganic chemical compound of molybdenum, for a period of about one-half to two hours, and thereafter heating the glass elements while maintaining them in contact along the surfaces to be united and including the treated portion of the element surface until at least the surface portion of one of the glass elements fuses sufficiently to effect wetting of the adjacent surface of another element and unites thereto.

2. In a process for making multi-focal lenses consisting of a plurality of integrally united optically different glass elements unified by fusion at their facing surfaces whereby at least one of the glass elements when fused wets and adheres to another, the steps of applying to a surface portion of one of the glass elements prior to fusion an aqueous solution containing 1% to 10% of a water-soluble oxygen-containing inorganic chemical compound selected from the group consisting of molybdic acid and its water-soluble salts, at a temperature within the range of about 25° C. to about 90° C. for a period of about one-half to two hours, and thereafter heating the glass elements while maintaining them in contact along the surfaces to be united and including the treated portion of the element surface until at least the surface portion of one of the glass elements fuses sufficiently to effect wetting of the adjacent surface of another element and unites thereto.

3. In a process for making composite glass articles consisting of a plurality of integrally united glass elements unified by fusion at their facing surfaces whereby at least one of the glass elements when fused wets and adheres to another, the steps of applying to a surface portion of one of the glass elements prior to fusion a 4% aqueous solution of sodium molybdate at a temperature of about 75° C. for a period of about one-half to two hours, and thereafter heating the glass elements while maintaining them in contact along the surfaces to be united and including the treated portion of the element surface until at least the surface portion of one of the glass elements fuses sufficiently to effect wetting of the adjacent surface of another element and unites thereto.

4. In a process for making multi-focal lenses consisting of a plurality of integrally united optically different glass elements unified by fusion at their facing surfaces whereby at least one of the glass elements when fused wets and adheres to another, the steps of applying to a surface portion of one of the glass elements prior to fusion a 4% aqueous solution of sodium molybdate at a temperature of about 75° C. for a period of about one-half to two hours, and thereafter heating the glass elements while maintaining them in contact along the surfaces to be united and including the treated portion of the element surface until at least the surface portion of one of the glass elements fuses sufficiently to effect wetting of the adjacent surface of another element and unites thereto.

References Cited in the file of this patent

UNITED STATES PATENTS

| Number | Name | Date |
|---|---|---|
| 1,449,343 | Moulton et al. | Mar. 20, 1923 |
| 1,565,598 | Sproesser | Dec. 15, 1925 |
| 1,996,442 | Stanley | Apr. 2, 1935 |
| 2,048,304 | Tillyer et al. | July 21, 1936 |
| 2,146,224 | Phillips | Feb. 7, 1939 |
| 2,205,181 | Shaver | June 18, 1940 |
| 2,280,322 | Tillyer | Apr. 21, 1942 |
| 2,290,911 | Jones | July 28, 1942 |
| 2,281,474 | Cartwright | Apr. 28, 1942 |
| 2,359,789 | Pincus | Oct. 10, 1944 |
| 2,366,516 | Geffeken | Jan. 2, 1945 |
| 2,398,708 | Hendrisi | Apr. 16, 1946 |
| 2,434,148 | De Paolis | Jan. 6, 1948 |
| 2,434,149 | De Paolis | Jan. 6, 1948 |
| 2,468,402 | Kreidl | Apr. 26, 1949 |
| 2,489,307 | Miller | Nov. 29, 1949 |
| 2,512,141 | Ma et al. | June 20, 1950 |
| 2,522,750 | Deschamps | Sept. 19, 1950 |
| 2,620,598 | Joblin-Purser et al. | Dec. 9, 1952 |

FOREIGN PATENTS

| Number | Country | Date |
|---|---|---|
| 308,075 | Germany | Sept. 23, 1918 |
| 608,298 | Great Britain | Sept. 13, 1948 |

OTHER REFERENCES

"Effect of Molybdenum and Other Oxides on Surface Tension of Silicate Melts and on Properties of Refractories and Abrasives," by C. R. Ambers, The Journal of the American Ceramic Society, vol. 29, No. 4, April 1, 1946, pages 87 to 93.

Ser. No. 395,364, Berger et al. (A. P. C.), published May 11, 1943.